ROTARY ACTUATOR
Howard M. Geyer, Dayton, Ohio, assignor to General Motors Corporation, Detroit, Mich., a corporation of Delaware
Filed Mar. 14, 1962, Ser. No. 179,590
2 Claims. (Cl. 74—89)

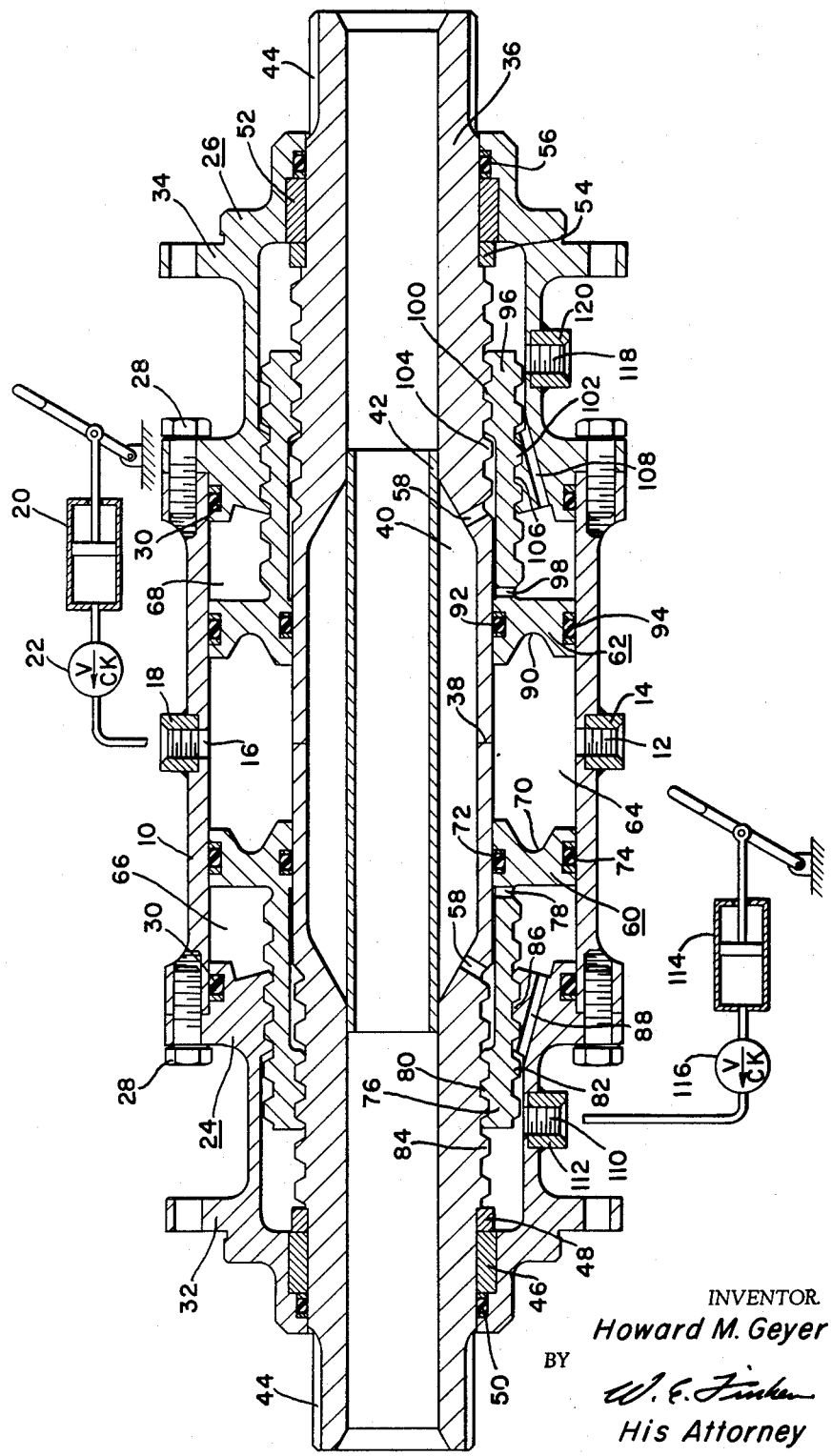

This invention pertains to rotary actuators, and particularly to fluid pressure operated rotary actuators of the helical spline type.

In my earlier Patent 2,945,387, a helical spline rotary actuator is disclosed comprising a pair of elongate, helically splined members which coact with a pair of relatively short, internally helically splined members so as to convert reciprocation of a piston to alternating rotary movement of a centrally mounted through shaft. However, in previous actuators of this type it was necessary to utilize spaced thrust bearing assemblies to support the axial trust loads imposed on the externally helically splined members. The present invention relates to an improved rotary actuator of the aforesaid type wherein the need for thrust bearing assemblies has been eliminated, thereby simplifying the actuator construction and significantly reducing the manufacturing cost thereof.

Accordingly, among my objects are the provision of an improved helical spline assembly for converting reciprocation to rotation; the further provision of a fluid pressure operated rotary actuator including a centrally mounted through shaft and a pair of opposed piston assemblies which are interconnected for simultaneous movement in opposite directions; the still further provision of a through shaft rotary actuator of the helical spline type wherein the shaft and cylinder assembly are placed in tension or compression in accordance with the direction of movement so as to eliminate the necessity for thrust bearings; and the still further provision of a rotary actuator of the helical spline type including primary hydraulic operating means and auxiliary, emergency hydraulic operating means.

The aforementioned and other objects are accomplished in the present invention by embodying a pair of oppositely movable piston assemblies in the actuator, which piston assemblies are helically connected with a centrally mounted through shaft so as to place the through shaft in tension during extending movement of the actuator pistons, and in compression during retracting movement of the pistons. Specifically, the actuator comprises a cylinder having a pair of opposed piston assemblies therein, each piston assembly comprising an annular piston head and an integral, axially extending skirt. The ends of the cylinder are closed by opposed end caps having relatively short, internally splined portions. The piston skirts have elongate, externally helically splined portions engaged with the internal helical splines on the end caps, and relatively short, internally helically splined portions engaged with elongate externally helically splined portions on a centrally mounted through shaft.

The through shaft is rotataby supported in the two end caps by radial sleeve bearings. The two piston assemblies divide the cylinder into a central extend chamber, and a pair of retract chambers, the retract chambers being hydraulically interconnected. When the extend chamber is pressurized with the retract chambers connected to drain, the two piston assemblies move in opposite directions towards their respective end caps, it being understood that movement of the two piston assemblies is automatically synchronized due to their helical spline connections with the through shaft. During extending movement of the piston assemblies, the through shaft is rotated in one direction and the medial portion thereof is placed in tension so as to absorb the thrust loads and eliminate the need for thrust bearings for the shaft in the cylinder assembly. Conversely, during retracting movement of the piston assemblies, the through shaft rotates in the opposite direction, and the medial portion of the through shaft is placed in compression to support the thrust loads.

In an actuator installation a source of hydraulic fluid under pressure is provided for operating the actuator under the control of a suitable valve. To provide for emergency operation, the present invention comprehends the use of hand pumps and a second set of ports to which the hand pumps are connected.

Further objects and advantages of the present invention will be apparent from the following description, reference being had to the accompanying drawing wherein a preferred embodiment of the present invention is clearly shown.

The drawing is a longitudinal sectional view of a rotary actuator constructed according to the present invention with the emergency operating means being shown schematically.

As shown in the drawing, the improved helical spline type rotary actuator includes a sleeve-type cylinder 10 having a port 12 with a fitting 14 adapted to be connected to the primary hydraulic fluid pressure source. In addition, the cylinder sleeve 10 has an auxiliary port 16 with a fitting 18 adapted to be connected to an emergency, or auxiliary, hand operated pump 20 through a one-way check valve 22.

Each end of the cylinder sleeve 10 has an end cap 24 and 26, respectively, flange connected thereto by a plurality of bolts 28. Suitable O-ring seals 30 are arranged between the end caps and the cylinder sleeve. End cap 24 has a mounting flange 32, and the end cap 26 has a similar mounting flange 34, by which the actuator can be attached to a suitable fixed support, not shown.

A hollow through shaft 36 is journalled in the cylinder assembly comprising the sleeve 10 and the end caps 32 and 34. The through shaft 36 actually comprises two shaft portions which are butt welded at 38 for assembly purposes. The intermediate portion of the through shaft 36 is formed with an enlarged cavity 40 which receives a tube 42, the ends of the tube being press fitted in the through bore of the shaft 36 to obtain a pressure tight joint. Opposite ends of the through shaft 36 are formed with straight splines 44 for connecting the through shaft to a load device, not shown.

The through shaft 36 is rotatably journalled in the end cap 24 by a radial sleeve bearing 46 which is held in assembled relation by a retaining ring 48. An O-ring seal 50 is arranged between the end cap 24 and the periphery of the through shaft 36. Similarly, the through shaft 36 is rotatably journalled in end cap 26 by a radial sleeve bearing 52 which is held in assembled relation by a retaining ring 54. A second O-ring seal 56 is arranged between the end cap 26 and the periphery of the through shaft 36. In addition, the through shaft 36 is formed with a plurality of ports 58 which interconnect the interior of the cylinder assembly and the chamber 40, for a purpose to be described hereinafter.

A pair of opposed piston assemblies 60 and 62 are disposed within the cylinder. The piston assemblies 60 and 62 divide the cylinder into a central extend chamber 64 and a pair of retract chambers 66 and 68 which are hydraulically interconnected through the ports 58 and the chamber 40.

The piston assembly 60 has an annular piston head 70 carrying O-ring seals 72 and 74, and an integral axially extending skirt 76. The skirt is formed with a plurality of radial ports 78 adjacent the piston head 70 to complete the communication between the chamber 40, the ports 58 and the retract chamber 66. In addition, the skirt 76 is formed with a relatively short set of internal helical spline teeth 80, and a relatively elongate set of external helical spline teeth 82. The internal helical spline teeth 80 mate with a relatively long set of external helical spline teeth 84 formed on the through shaft 36. The external helical spline teeth 82 mate with a relatively short set of internal helical spline teeth 86 formed on the end cap 24. In addition, the end cap 24 has a passage 88 which further facilitates complete hydraulic interconnection of all portions of the retract chamber 66 which extends into the end cap 24.

Similarly, the piston assembly 62 has an annular piston head portion 90 carrying internal and external O-ring seals 92 and 94, and an integral axially extending skirt 96. The skirt 96 likewise has a plurality of radial ports 98, as well as a set of relatively short, internal helical spline teeth 100, and a set of relatively elongate, external helical spline teeth 102. The internal helical spline teeth 100 mate with a relatively elongate set of external helical spline teeth 104 on the shaft 36, and the external helical spline teeth 102 mate with a relatively short set of internal helical spline teeth 106 on the end cap 26. In addition, the end cap 26 has a passage 108 to facilitate complete communication between all portions of the retract chamber 68 which likewise extends into the end cap 26.

The end cap 24 has a port 110 with a fitting 112 which can be connected to an auxiliary hand pump 114 through a one-way check valve 116. The end cap 26 has a port 118 with a fitting 120. The port 118 constitutes the retract port for the actuator assembly, while the port 12 constitutes the extend port, it being understood that the ports are connected to a suitable four-way valve to a primary source of hydraulic fluid under pressure such that when the extend chamber 64 is pressurized, the retract chambers 66 and 68 are connected to drain, and vice versa.

As alluded to hereinbefore, one of the significant features of the instant actuator is the elimination of thrust bearings as required in the rotary actuator of my earlier Patent 2,945,387. The thrust bearings are eliminated by virtue of using a pair of oppositely movable piston assemblies 60 and 62, both piston assemblies being helically connected to spaced portions of the through shaft 36 so that during extend movement the medial portion of the thrust shaft is placed in tension to support the thrust loads, and during retraction the medial portion of the through shaft is placed in compression to support the thrust loads. In effect, the internally helically splined end caps 24 and 26, which are nonrotatable, constitute reaction members whereas the externally helically splined portions on the shaft 36 constitute output members. The internal helical spline teeth on the end caps and the external helical spline teeth on the through shaft can be of the same hand, different hands, the same lead, or different leads, depending upon the desired angular movement torque output required of the shaft 36. Thus, in instances where a maximum angular movement is desired with a minimum torque, the helical spline teeth on the end caps and the through shaft would be of different hands but of the same lead, and in instances where a minimum angular movement is required, with a maximum torque, the helical splines on the end cap in the through shaft would be of the same hand but of different leads.

In operation, when the extend actuator chamber 64 is pressurized, and retract chambers 66 and 68 connected to drain, the piston assemblies 60 and 62 move in opposite directions away from each other and towards their respective end caps. As the piston assemblies 60 and 62 move away from each other, the coacting helical splines will result in angular movement of the two piston assemblies 60 and 62, and thus, angular movement will be imparted to the through shaft 36. The two piston assemblies 60 and 62 always move in exact synchronism since they are mechanically interconnected by the through shaft 36, and during movement of the piston assemblies 60 and 62 away from each other, the medial portion of the through shaft 36 and the cylinder assembly are placed in tension thereby supporting the thrust loads.

Conversely, when hydraulic fluid under pressure is supplied to port 118, and the port 12 is connected to drain, the retract chambers 66 and 68 are pressurized. Hydraulic fluid under pressure flowing through port 118 can pass between the helical splines through passage 108 and thence through the radial passages 98 and the ports 58 to the chamber 40, from whence it can pass through the ports 58 and 78 as well as the passage 88 to the retract chamber 66. Accordingly, the two piston assemblies 60 and 62 will move towards each other thereby imparting rotation to the through shaft 36 in the opposite direction. During retraction, or during movement of the piston assemblies 60 and 62 towards each other, the medial portion of the shaft 36 and the cylinder assembly are placed in compression to support the thrust loads. Movement of the piston assemblies 60 and 62 towards each other is likewise mechanically synchronized by reason of their connection with the through shaft 36.

From the foregoing it is readily apparent that the present invention further simplifies and reduces the cost of manufacture of rotary actuators of the helical spline type in that it embodies internal helical spline members which are relatively short, which members coact with elongate, external helical spline members. In addition, by embodying a pair of oppositely movable piston assemblies, the thrust bearing assemblies required in actuators of previous designs can be eliminated with the thrust loads being directly supported by placing the through shaft in tension or compression, dependent upon the direction of movement of the piston assemblies.

While the embodiment of the invention as herein disclosed constitutes a preferred form, it is to be understood that other forms might be adopted.

What is claimed is as follows:

1. A fluid pressure operated rotary actuator including, a cylinder assembly comprising a cylinder sleeve having a pair of end caps attached thereto, a pair of opposed piston assemblies disposed in said cylinder assembly and dividing said cylinder assembly into a central extend chamber and a pair of retract chambers, each piston assembly having an annular piston head and an axially extending skirt, a rotary through shaft journalled in said end caps having a through bore with an enlarged chamber in the medial portion thereof, a tube press fitted in the bore of said through shaft to form an annular chamber, a plurality of ports in said through shaft communicating with said annular chamber and the retract chambers in said cylinder assembly so as to fluidly interconnect said retract chambers, and means interconnecting said piston assemblies for simultaneous movement in opposite directions comprising helical connections between said skirts and said through shaft whereby reciprocation of said pistons will impart rotation to said through shaft, the thrust loads of said piston being supported by placing the medial portion of said through shaft in tension or compression dependent upon the direction of movement of said pistons.

2. A fluid pressure operated rotary actuator including, a cylinder assembly comprising a cylinder sleeve having a pair of end caps attached thereto, a pair of opposed piston assemblies disposed in said cylinder assembly and dividing said cylinder assembly into a central extend chamber and a pair of retract chambers, each piston assembly having an annular piston head and an axially extending skirt, a rotary through shaft journalled in said end caps having a through bore with an enlarged chamber in the medial portion thereof, a tube press fitted in the bore of said through shaft to form an annular chamber, a plurality of ports in said through shaft communicating with said annular chamber and said retract chambers in said cylinder assembly, each piston skirt having a plurality of ports therethrough, each end cap having passage means therethrough whereby the retract chambers in said cylinder assembly are fluidly interconnected through the ports in said through shaft, the ports in each piston skirt and the passage means in each end cap, and means interconnecting said piston assemblies for simultaneous movement in opposite directions comprising helical connections between said skirts and said through shaft whereby reciprocation of said pistons will impart rotation to said through shaft, the thrust loads of said pistons being supported by placing the medial portion of said through shaft in tension or compression dependent upon the direction of movement of said pistons.

References Cited by the Examiner
UNITED STATES PATENTS

| | | |
|---|---|---|
| 2,660,029 | 11/53 | Geyer. |
| 2,791,128 | 5/57 | Geyer _____ 74—424.8 XR |
| 2,932,206 | 4/60 | Tootle _____ 74—89 |
| 2,959,064 | 11/60 | Geyer et al. _____ 74—89 XR |
| 2,970,574 | 2/61 | Geyer _____ 92—33 XR |
| 3,036,472 | 5/62 | Geyer _____ 74—89 |
| 3,036,473 | 5/62 | Geyer _____ 74—89 |
| 3,141,387 | 7/64 | Geyer _____ 74—89 XR |

BROUGHTON G. DURHAM, *Primary Examiner.*